(12) United States Patent
Mega et al.

(10) Patent No.: US 11,034,106 B2
(45) Date of Patent: Jun. 15, 2021

(54) METHOD FOR REPAIRING CERAMIC MATRIX COMPOSITE AND CERAMIC MATRIX COMPOSITE MEMBER

(71) Applicant: MITSUBISHI HEAVY INDUSTRIES, LTD., Tokyo (JP)

(72) Inventors: Masahiko Mega, Tokyo (JP); Takayuki Kurimura, Tokyo (JP); Taiji Torigoe, Tokyo (JP); Mineaki Matsumoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 307 days.

(21) Appl. No.: 16/029,117

(22) Filed: Jul. 6, 2018

(65) Prior Publication Data

US 2019/0016072 A1    Jan. 17, 2019

(30) Foreign Application Priority Data

Jul. 11, 2017  (JP) .............................. JP2017-135495

(51) Int. Cl.
    *B29C 73/26*        (2006.01)
    *B29C 73/24*        (2006.01)
    (Continued)

(52) U.S. Cl.
    CPC ............ *B29C 73/245* (2013.01); *B29C 73/04* (2013.01); *B29C 73/26* (2013.01);
    (Continued)

(58) Field of Classification Search
    CPC ....... B29C 73/245; B29C 73/04; B29C 73/26; C04B 35/76; C04B 41/0018
    See application file for complete search history.

(56) References Cited

U.S. PATENT DOCUMENTS 5,928,448 A   7/1999 Daws
10,774,648 B2 * 9/2020 Roberts ................. F04D 29/542
(Continued)

FOREIGN PATENT DOCUMENTS

JP   H01-310908 A   12/1989
JP   2000-143358 A   5/2000
(Continued)

OTHER PUBLICATIONS

Office Action dated Jan. 28, 2020, issued in counterpart JP Application No. 2017-135495, with English translation. (8 pages).
Office Action dated Jun. 23, 2020, issued in counterpart JP application No. 2017-135495, with English Translation. (6 pages).

*Primary Examiner* — Jeffry H Aftergut
*Assistant Examiner* — Jaeyun Lee
(74) *Attorney, Agent, or Firm* — Westerman, Hattori, Daniels & Adrian, LLP

(57) ABSTRACT

A method for repairing a target member including a ceramic matrix composite reinforced by ceramic fiber includes: a removal step of removing at least a part of a surface of the target member; an arrangement step of arranging a green body for repair which includes the ceramic fiber on a portion where the surface is removed in the removal step; an impregnation step of impregnating at least the portion of the target member where the green body for repair is disposed with slurry; and a sintering step of sintering the target member on which the green body for repair is disposed, after the impregnation step.

7 Claims, 15 Drawing Sheets

(51) Int. Cl.
  *B29C 73/04* (2006.01)
  *C04B 41/00* (2006.01)
  *C04B 35/76* (2006.01)
  *C04B 41/52* (2006.01)
  *C04B 41/89* (2006.01)
  *C04B 35/80* (2006.01)
  *C04B 35/626* (2006.01)

(52) U.S. Cl.
  CPC ........ *C04B 35/62625* (2013.01); *C04B 35/76* (2013.01); *C04B 35/80* (2013.01); *C04B 41/009* (2013.01); *C04B 41/0018* (2013.01); *C04B 41/52* (2013.01); *C04B 41/89* (2013.01); *B29C 2073/264* (2013.01); *B29C 2073/268* (2013.01); *C04B 2235/616* (2013.01); *C04B 2235/77* (2013.01); *C04B 2235/96* (2013.01)

(56) References Cited

U.S. PATENT DOCUMENTS

| | | | |
|---|---|---|---|
| 2003/0196305 | A1 | 10/2003 | Kebbede et al. |
| 2014/0272249 | A1* | 9/2014 | Lee .............. C04B 41/009 428/63 |
| 2015/0115489 | A1 | 4/2015 | Corman |
| 2017/0145560 | A1 | 5/2017 | Weaver et al. |

FOREIGN PATENT DOCUMENTS

| | | |
|---|---|---|
| JP | 2002-46028 A | 2/2002 |
| JP | 2005-205902 A | 8/2005 |
| JP | 5773688 B2 | 9/2015 |
| JP | 2016-79922 | 5/2016 |
| JP | 2016-540717 A | 12/2016 |
| JP | 2017-105699 A | 6/2017 |

* cited by examiner

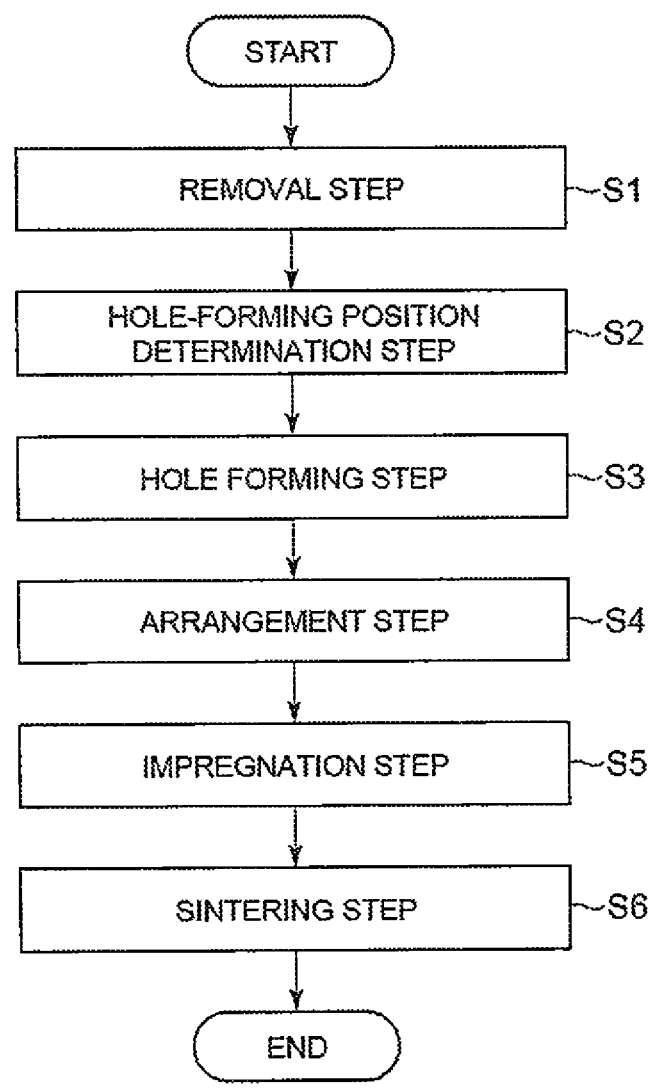

METHOD FOR REPAIRING CERAMIC MATRIX COMPOSITE AND CERAMIC MATRIX COMPOSITE MEMBER

TECHNICAL FIELD

The present disclosure relates to a method for repairing a ceramic matrix composite and a ceramic matrix composite member.

BACKGROUND

As a material of a component required to have a high strength in a high temperature range, ceramic matrix composites (CMC) have been recently drawing attention, and have been researched and developed.

A component formed from CMC, or a CMC component may develop small cracks in its matrix when receiving an excessive load upon usage, for instance. There is a known method for repairing such small cracks in the matrix (see Patent Document 1). In this repair method, a micro crack is repaired by moving a silicon phase that exists in the matrix of the CMC component to the micro crack.

CITATION LIST

Patent Literature

Patent Document 1: JP2016-540717A (translation of a PCT application)

SUMMARY

Problems to be Solved

When using a CMC component as a part of components of a gas turbine, an air plane, or an automobile, for instance, the surface of the CMC component may become damaged partially by wear. However, the above repair method for Patent Document 1 is a method for repairing matrix micro cracks in a CMC component, and not for repairing damage on a surface of a CMC component.

Accordingly, a method for repairing damage on a surface of a CMC component is not yet established.

In view of the above, an object of at least one embodiment of the present invention is to provide a method for repairing damage on a surface of a CMC component.

Solution to the problems (1) According to at least one embodiment of the present invention, a method for repairing a target member formed from a ceramic matrix composite reinforced by ceramic fiber includes: a removal step of removing at least a part of a surface of the target member; an arrangement step of arranging a green body for repair which includes the ceramic fiber on a portion where the surface is removed in the removal step; an impregnation step of impregnating at least the portion of the target member where the green body for repair is disposed with slurry; and a sintering step of sintering the target member on which the green body for repair is disposed, after the impregnation step.

According to the above method (1), the green body for repair including ceramic fiber is disposed on the portion where the surface is removed in the removal step, and at least the portion of the target member with the green body for repair is impregnated with slurry. For impregnating at least the portion of the target member where the green body for repair is disposed with the slurry, the slurry may be injected after air-tightly sealing the circumference of the portion with the green body for repair and depressurizing the portion with the green body for repair, and for instance, the slurry may be injected under pressure into the air-tightly sealed portion where the green body for repair is disposed. By impregnating at least a portion of the target member where the green body for repair is disposed with the slurry, the slurry sufficiently permeates into the green body for repair and between the green body for repair and the surface of the target member. Accordingly, it is possible to improve the adhesion strength between the target member and the additional portion additionally provided by the green body for repair, after sintering. Thus, it is possible to ensure the strength of the repaired target member, whereby it is possible to repair and reuse the target member, and reduce the costs compared to a case where the target member is replaced with a fresh component.

(2) In some embodiments, the above method (1) further includes a hole-forming step of forming at least one hole on the portion where the surface is removed, after the removal step.

According to the above method (2), the at least one hole is formed on the portion where the surface is removed in the removal step, and thus the slurry permeates into the formed holes. Thus, when the slurry permeating into the holes is sintered, the slurry functions as an anchor member between the target member and the additional portion additionally provided by the green body for repair. Accordingly, it is possible to improve the adhesion strength between the target member and the additional portion additionally provided by the green body for repair, after sintering.

(3) In some embodiments, in the above method (2), the portion where the surface is removed in the removal step includes a first region where a density of the ceramic fiber is relatively high and a second region where the density of the ceramic fiber is lower than that in the first region, and the hole-forming step includes forming the at least one hole in the second region.

According to the above method (3), the hole is formed in the second region where the density of ceramic fiber is relatively lower than that in the first region where the density of ceramic fiber is relatively high. Accordingly, it is possible to suppress the number of threads of ceramic fiber to be cut off due to formation of the hole. Thus, it is possible to suppress a decrease in the strength of the repaired target member, while improving the adhesion strength between the target member and the additional portion additionally provided by the green body for repair after sintering.

(4) In some embodiments, in the above method (3), the ceramic fiber includes a layer including a first bundle of the ceramic fiber extending in a first direction, a second bundle of the ceramic fiber extending in the first direction adjacent to the first bundle, a third bundle of the ceramic fiber extending in a second direction interesting with the first direction, and a fourth bundle of the ceramic fiber extending in the second direction adjacent to the third bundle, the first bundle and the second bundle intersecting with the third bundle and the fourth bundle, respectively, and the hole-forming step includes forming the at least one hole in a position between the first bundle and the second bundle, and the hole formed is also in a position between the third bundle and the fourth bundle.

According to the above method (4), the at least one hole is formed in the position between the first bundle and the second bundle and between the third bundle and the fourth bundle. Accordingly, it is possible to suppress the number of threads of ceramic fiber to be cut off due to formation of the hole in each bundle. Thus, it is possible to suppress a decrease in the strength of the repaired target member, while improving the adhesion strength between the target member and the additional portion additionally provided by the green body for repair after sintering.

(5) In some embodiments, the above method (3) or (4) further includes, after the removal step, a hole-forming position determination step of capturing an image of a layer of the ceramic fiber remaining on the target member, performing an image processing on the image obtained by the capturing, and determining a position for forming the at least one hole on the basis of a result of the image processing.

According to the above method (5), after the removal step, the method includes capturing an image of a layer of the ceramic fiber remaining on the target member, performing an image processing on the image obtained by the capturing, and determining a position for forming the hole on the basis of a result of the image processing. Accordingly, it is possible to determine the position for forming the hole so as to cut off as few ceramic fiber as possible. Thus, it is possible to suppress a decrease in the strength of the repaired target member, while improving the adhesion strength between the target member and the additional portion additionally provided by the green body for repair after sintering.

(6) In some embodiments, in the above method (4), a depth of the at least one hole is smaller than a thickness of a single layer of the ceramic fiber.

According to the above method (6), ceramic fiber is cut off due to formation of the hole only within a single layer of fabric of ceramic fiber. Thus, it is possible to suppress a decrease in the strength of the repaired target member, while improving the adhesion strength between the target member and the additional portion additionally provided by the green body for repair after sintering.

(7) In some embodiments, in the above methods (1) to (6), the impregnation step includes: a deaeration step of deaerating at least a portion of the target member where the green body for repair is disposed; and an immersion step of immersing at least the portion of the target member where the green body for repair is disposed in the slurry, after the deaeration step.

According to the above method (7), the portion with the green body for repair is deaerated, and then at least the portion of the target member with the green body for repair is immersed in slurry. Accordingly, the slurry sufficiently permeates into the green body for repair and between the green body for repair and the surface of the target member, which makes it possible to improve the adhesion strength between the target member and the additional portion additionally provided by the green body for repair, after sintering.

(8) According to at least one embodiment of the present invention, a ceramic matrix composite member formed from a ceramic matrix composite reinforced by ceramic fiber includes: a body portion; and a joint portion joined integrally to the body portion, the joint portion occupying a part of a surface of the ceramic matrix composite member. At least one of an extension direction of bundles of the ceramic fiber or an arrangement interval of bundles of the ceramic fiber is different in the body portion and the joint portion.

With the above configuration (8), the ceramic matrix composite member includes a body portion, and a joint portion which is integrally joined to the body portion and which occupies a part of the surface of the ceramic matrix composite member. Such a ceramic matrix composite member can be produced by a method according to the above (1) to (7). Further, it is possible to remove the joint portion from the ceramic matrix composite member and join a fresh joint portion integrally to the body portion, and thus it is possible to repair the ceramic matrix composite member even if the joint portion of the ceramic matrix composite member becomes damaged.

(9) According to at least one embodiment of the present invention, a ceramic matrix composite member formed from a ceramic matrix composite reinforced by ceramic fiber includes: a body portion; and a joint portion joined integrally to the body portion, the joint portion occupying a part of a surface of the ceramic matrix composite member. The body portion includes at least one hole extending toward an inside of the body portion from a boundary surface between the body portion and the joint portion, and the at least one hole is filled with a matrix of the ceramic matrix composite.

With the above configuration (9), the ceramic matrix composite member includes a body portion, and a joint portion which is integrally joined to the body portion and which occupies a part of the surface of the ceramic matrix composite member. Such a ceramic matrix composite member can be produced by a method according to the above (2) to (7). Further, it is possible to remove the joint portion from the ceramic matrix composite member and join a fresh joint portion integrally to the body portion, and thus it is possible to repair the ceramic matrix composite member even if the joint portion of the ceramic matrix composite member becomes damaged.

Furthermore, with the above configuration (9), the body portion includes at least one hole extending toward the inside of the body portion from the boundary surface between the body portion and the joint portion, the at least one hole being filled with the matrix of the ceramic matrix composite. Accordingly, the matrix of the ceramic matrix composite filling the hole functions as an anchor member between the body portion and the joint portion. Accordingly, it is possible to improve the adhesion strength between the body portion and the joint portion in the ceramic matrix composite member, and ensure the strength of the ceramic matrix composite member.

Advantageous Effects

According to at least one embodiment of the present invention, it is possible to provide a method for repairing damage on a surface of a CMC component.

BRIEF DESCRIPTION OF DRAWINGS

FIG. 2 is a flowchart of a procedure in a method for repairing a ceramic matrix composite according to another embodiment.

FIG. 8A is a cross section of a single piece of fabric woven from ceramic fiber. FIG. 8B is an enlarged view of a part of FIG. 8A. FIG. 8C is a diagram showing a plurality of laminated layers of fabric.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
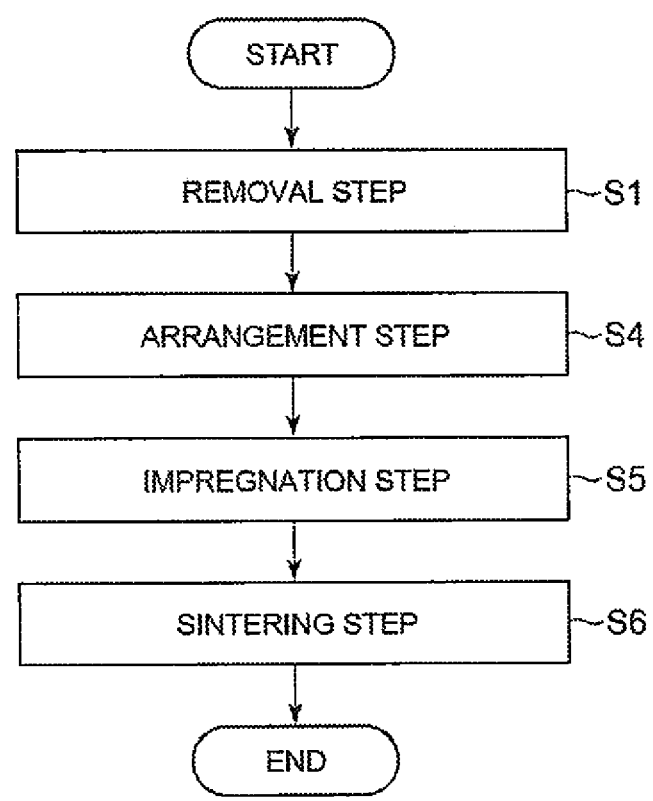
FIG. 1 is a flowchart of a procedure in a method for repairing a ceramic matrix composite according to an embodiment.

FIG. 1 is a flowchart of a procedure in a method for repairing a ceramic matrix composite according to an embodiment. FIG. 2 is a flowchart of a procedure in a method for repairing a ceramic matrix composite according to another embodiment.

According to some embodiments, a method for repairing a ceramic matrix composite is a method for repairing a target member including a ceramic matrix composite reinforced by ceramic fiber, and, as shown in FIGS. 1 and 2, includes: a removal step S1 of removing at least a part of a surface of the target member; an arrangement step S4 of arranging a green body for repair which includes the ceramic fiber on a portion where the surface is removed in the removal step S1; an impregnation step S5 of impregnating at least the portion of the target member where the green body for repair is disposed with slurry; and a sintering step S6 of sintering the target member on which the green body for repair is disposed, after the impregnation step S5.

In another embodiment shown in FIG. 2, the method further includes a hole-forming step S3 of forming at least one hole on the portion where the surface is removed in the removal step S1, after the removal step S1. Furthermore, in another embodiment shown in FIG. 2, the method further includes, after the removal step S1, a hole-forming position determination step S2 of capturing an image of a layer of the ceramic fiber remaining on the target member, performing an image processing on the image obtained by the capturing, and determining a position for forming the at least one hole on the basis of a result of the image processing.

With reference to FIGS. 3A to 3D and FIGS. 4A to 4D, each step of the flow chart shown in FIGS. 1 and 2 will be described. FIGS. 3A to 3D are each a schematic diagram of a cross section of a target member to be repaired by the method for repairing a ceramic matrix composite according to an embodiment shown in FIG. 1. FIGS. 4A to 4D are each a schematic diagram of a cross section of a target member to be repaired by the method for repairing a ceramic matrix composite according to another embodiment shown in FIG. 2.

Figure 3A:
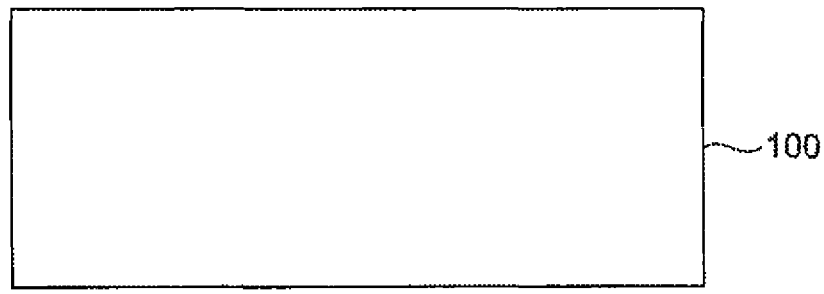
FIGS. 3A(a)-3A(c) are schematic diagrams of a cross section of a target member to be repaired by the method for repairing a ceramic matrix composite according to an embodiment shown in FIG. 1.
Figure 3A:
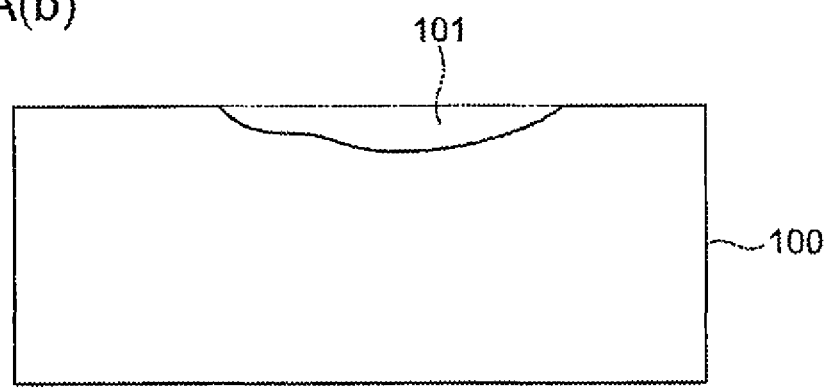
Figure 3A:
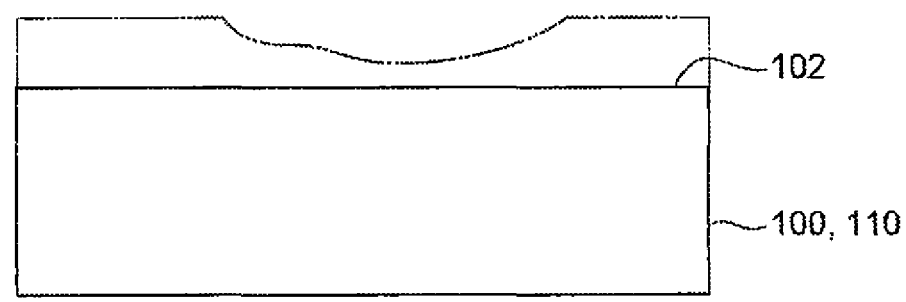
Figure 3B:
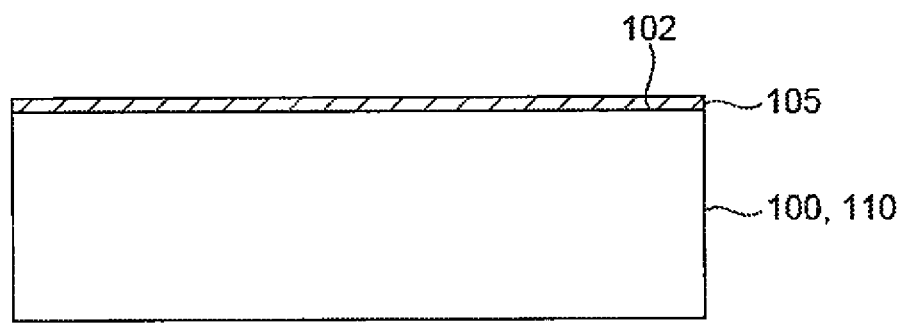
FIG. 3B(a) and FIG. 3B(b) are schematic diagrams of a cross section of a target member to be repaired by the method for repairing a ceramic matrix composite according to an embodiment shown in FIG. 1.
Figure 3B:
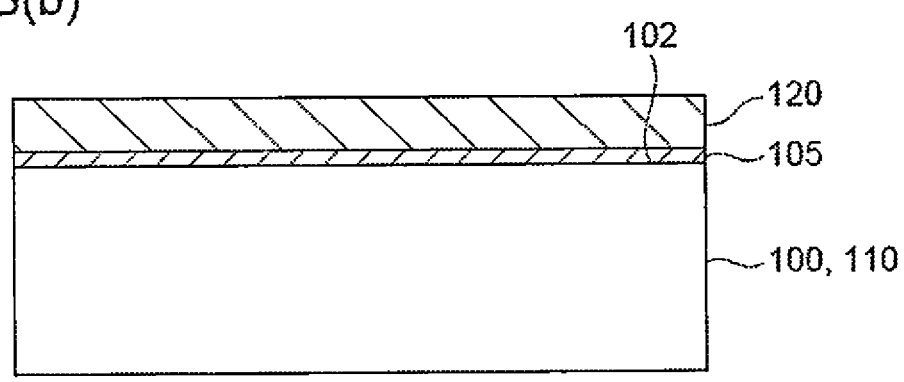
Figure 3C:
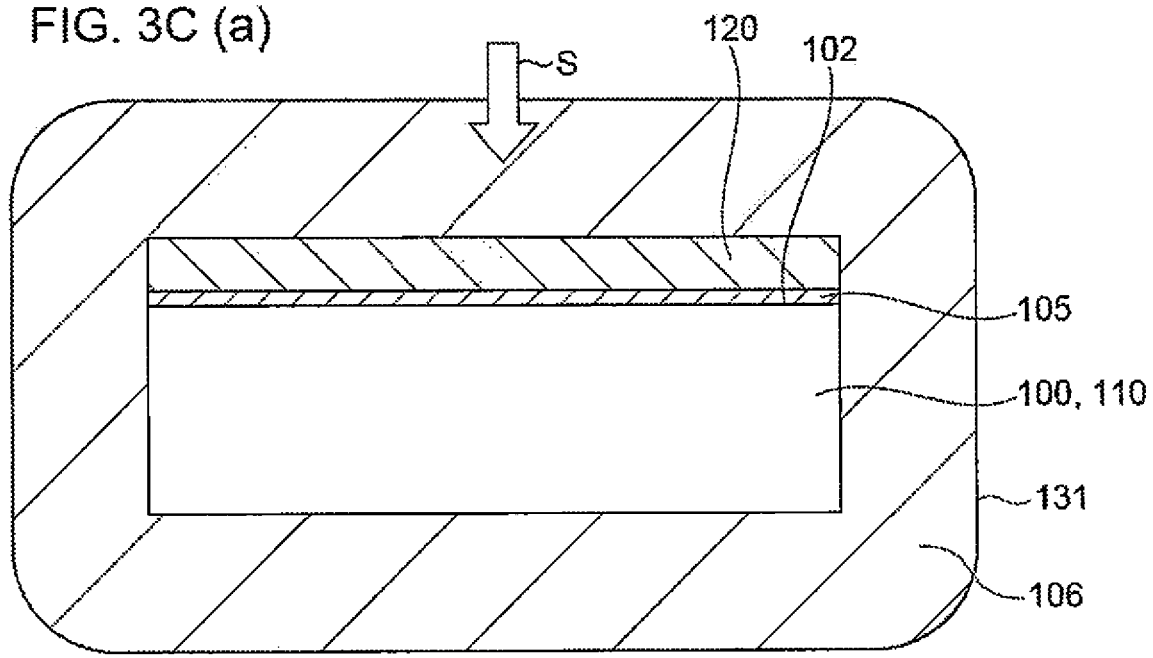
FIG. 3C(a) and FIG. 3C(b) are schematic diagrams of a cross section of a target member to be repaired by the method for repairing a ceramic matrix composite according to an embodiment shown in FIG. 1.
Figure 3C:
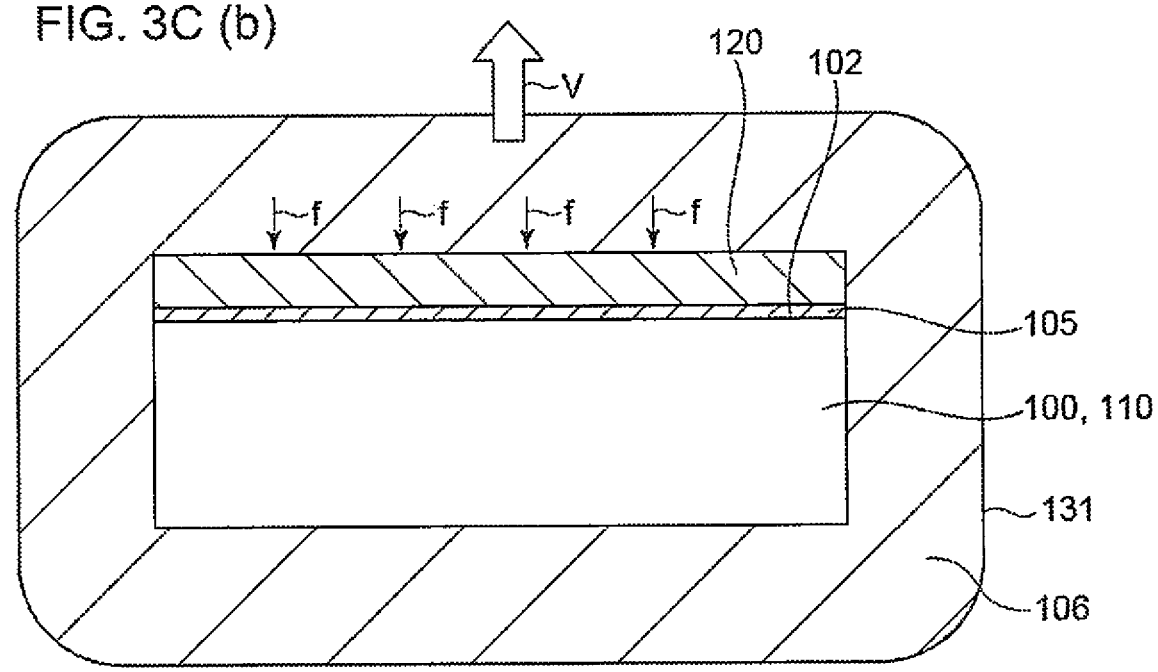
Figure 3D:
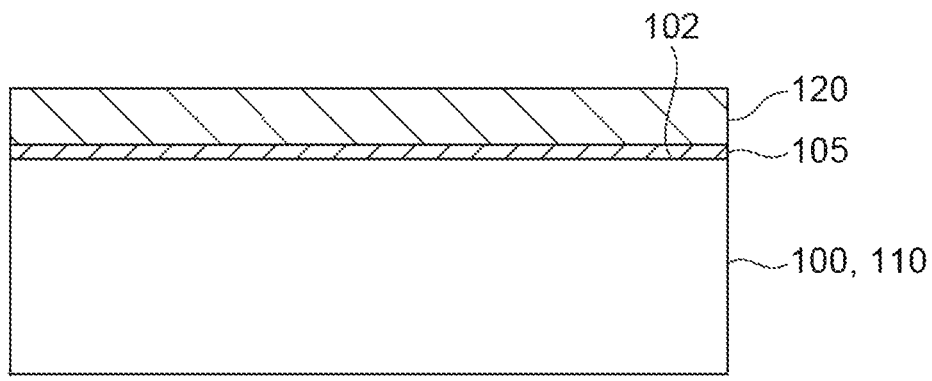
FIG. 3D(a) and FIG. 3D(b) are schematic diagrams of a cross section of a target member to be repaired by the method for repairing a ceramic matrix composite according to an embodiment shown in FIG. 1.
Figure 3D:
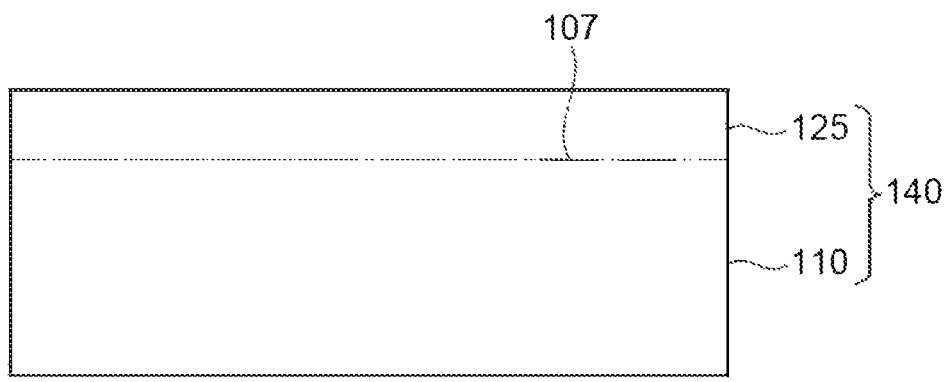
Figure 4A:
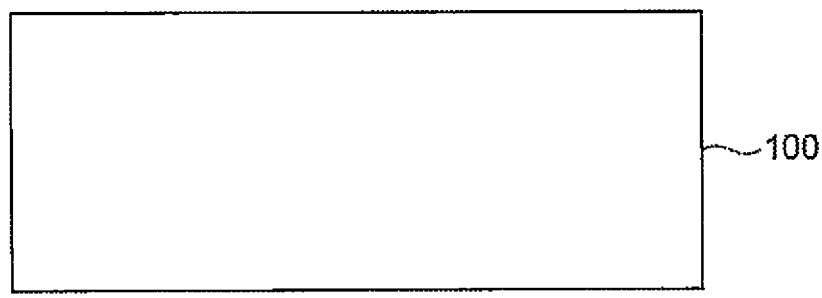
FIGS. 4A(a)-4A(d) are schematic diagrams of a cross section of a target member to be repaired by the method for repairing a ceramic matrix composite according to another embodiment shown in FIG. 2.
Figure 4A:
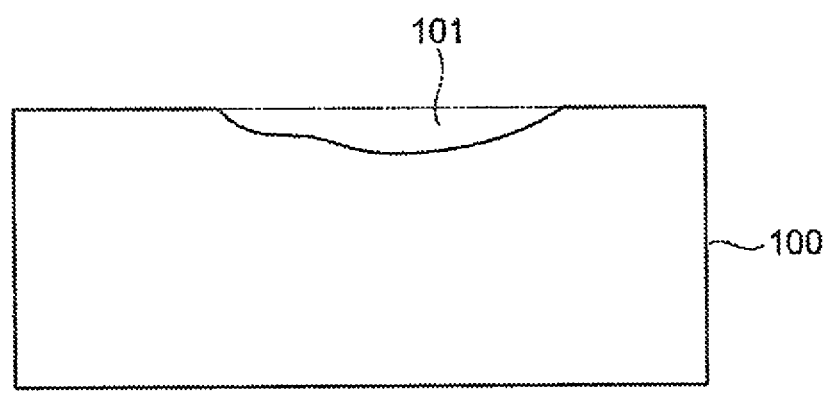
Figure 4A:
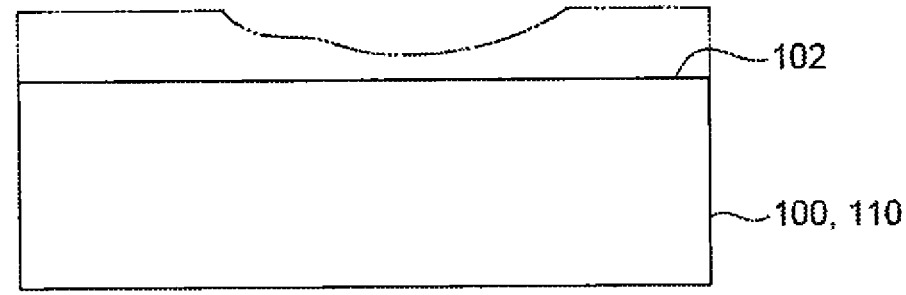
Figure 4A:
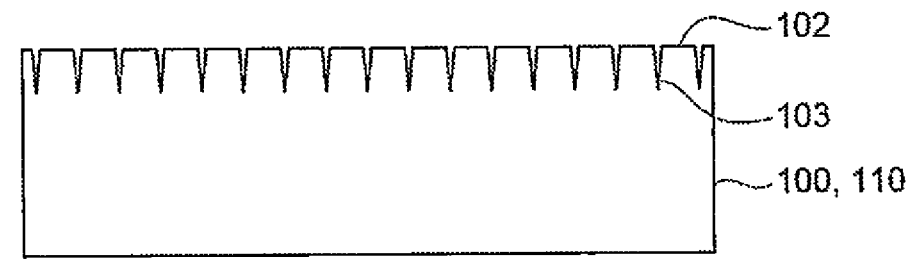

FIGS. 3A and FIG. 4A are schematic diagrams of a target member 100 according to some embodiments, showing a state before the surface becomes damaged. The target member 100 is a member to be repaired by a method for repairing a ceramic matrix composite according to some embodiments, which is a component formed from CMC (CMC component). The target member 100 shown in FIGS. 3A to 3D and FIGS. 4A to 4D includes a plurality of layers of fabric (not shown) woven from ceramic fiber in the CMC component. In the target member 100 shown in FIGS. 3A to 3D and FIGS. 4A to 4D, each layer of fabric is arranged so as to extend in the right-left direction and the front-back direction in the drawings. Further, in the target member 100 shown in FIGS. 3A to 3D and FIGS. 4A to 4D, a plurality of layers of fabric are laminated in the vertical direction in the drawing. Hereinafter, the layers of fabric woven from ceramic fiber in the CMC component are also referred to as merely ceramic fiber layers.

In FIGS. 3A(b) and FIG. 4A(b), a part of the surface of the target member 100 shown in FIGS. 3A(a) and FIG. 4A(a) is damaged. If a part of the surface of the target member 100 becomes damaged as described above, the target member 100 is repaired by the method for repairing a ceramic matrix composite according to some embodiments as follows.

In some embodiments, in the removal step S1 shown in FIGS. 1 and 2, at least a part of the surface of the target member 100 is removed. Specifically, in the removal step S1, by removing the circumference of the damaged portion 101 of the target member 100, a surface to be joined to a green body for repair by sintering is prepared. Hereinafter, a joint surface 102 refers to the surface to be joined to a green body for repair by sintering, obtained by removing the circumference of the damaged portion 101 of the target member 100. Further, the target member 100 after removing the circumference of the damaged portion 101 is also referred to as a body portion 110.

Figure 5:
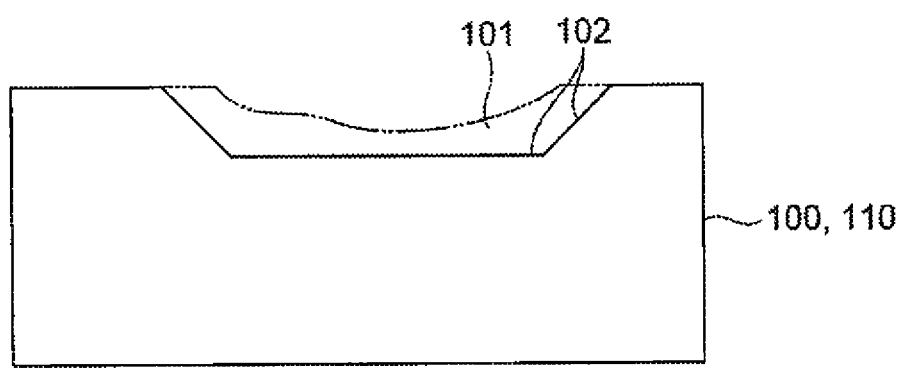
FIG. 5 is a diagram showing a state where a portion around a damaged portion of the target member is removed.

In the removal step S1, the surface of the target member 100 may be removed entirely as shown in FIGS. 3A(c) and 4A(c), or partially around the damaged portion as shown in FIG. 5. FIG. 5 is a diagram showing a state where a portion around the damaged portion 101 of the target member 100 is removed.

Further, in the method for repairing a ceramic matrix composite according to another embodiment shown in FIG. 2, after performing the removal step S1, in the hole-forming position determination step S2, the position for forming a hole in the hole forming step S3 is determined. The details of the hole forming position determination step S2 and the position of the hole will be described later.

In the method for repairing a ceramic matrix composite according to another embodiment shown in FIG. 2, after performing the hole-forming position determination step S2, the hole forming step S3 is performed. In the hole forming step S3, at least one micro hole 103 is formed on the hole forming position determined in the hole-forming position determination step S2, on the joint surface 102. The number and depth of holes to be formed in the hole forming step S3 will be described later in detail.

In another embodiment, for instance, information of the position of the hole 103 determined in the hole-forming position determination step S2 is input to a control device of a hole-forming device (not depicted). In the hole forming step S3, the control device of the non-depicted hole forming device controls the position of a drill of the non-depicted hole forming device on the basis of the information of the position of the hole 103 that is input to the control device, thereby forming the hole 103 in the position determined in the hole-forming position determination step S2.

Next, in some embodiments, in the arrangement step S4 shown in FIGS. 1 and 2, a green body 120 for repair including ceramic fiber is arranged on the portion where the surface of the target member 100 is removed at least partially in the removal step S1, that is, the joint surface 102 of the body portion 110.

Figure 4B:
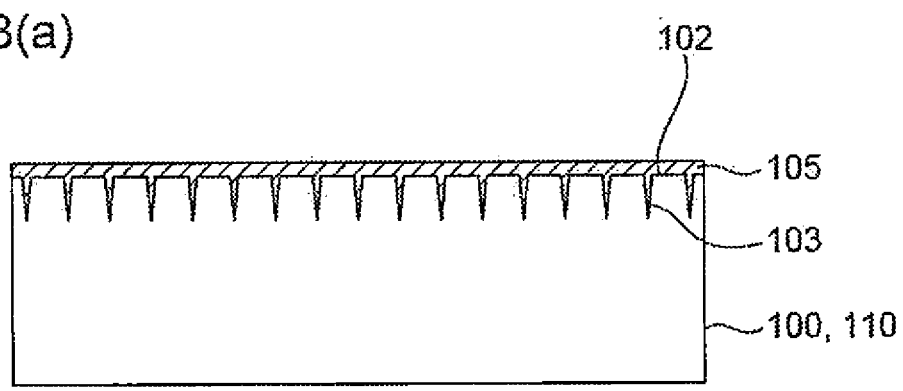
FIG. 4B(a) and FIG. 4B(b) are schematic diagrams of a cross section of a target member to be repaired by the method for repairing a ceramic matrix composite according to another embodiment shown in FIG. 2.
Figure 4B:
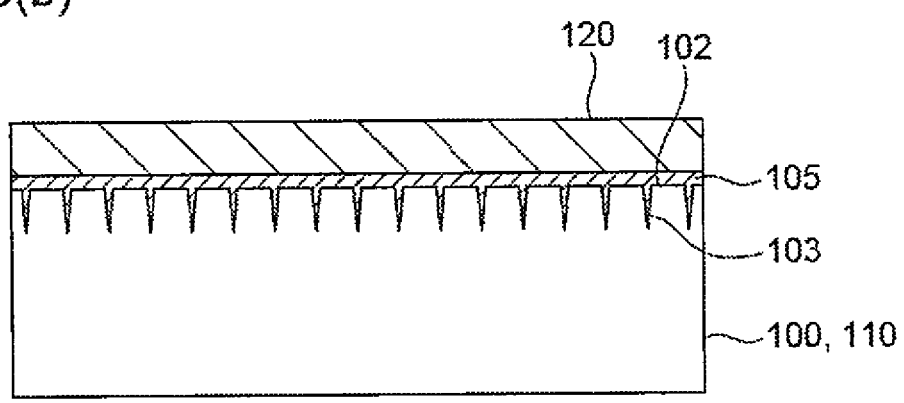

Specifically, in the arrangement step S4, as shown in FIGS. 3B(a) and FIG. 4B(a), the slurry 105 is applied to the joint surface 102. The slurry (hereinafter, also referred to as application slurry) 105 has the same composition as the slurry used in production of the target member 100 (hereinafter, also referred to as material slurry). Further, the slurry concentration of the application slurry 105 may be different from that of the material slurry. Further, a part of components or the content ratio of a sintering agent may be different between the application slurry 105 and the material slurry.

In the target member 100 (body portion 110) according to an embodiment shown in FIG. 3B(a), the application slurry 105 applied to the joint surface 102 permeates into non-depicted apertures in the matrix which open into the joint surface 102. In the target member 100 (body portion 110) according to another embodiment shown in FIG. 4B(a), the application slurry 105 applied to the joint surface 102 permeates into the hole 103 formed in the hole-forming step S3, and into the non-depicted apertures in the matrix opening into the joint surface 102.

In the arrangement step S4, as shown in FIGS. 3B(b) and FIG. 4B(b), the green body 120 for repair is placed on the joint surface 102 after application of the application slurry 105 to the joint surface 102. The green body 120 is a plurality of layers of fabric woven from ceramic fiber used in the target member 100, impregnated with a slurry having the same composition as the material slurry. Further, the slurry concentration of the slurry for impregnating the green body 120 may be different from that of the material slurry. Further, a part of components or the content ratio or the like of a sintering agent may be different between the slurry for impregnating the green body 120 and the material slurry.

Next, in some embodiments, in the impregnation step S5 shown in FIGS. 1 and 2, at least a portion of the target member 100 on which the green body for repair is disposed is impregnated with slurry.

Figure 4C:
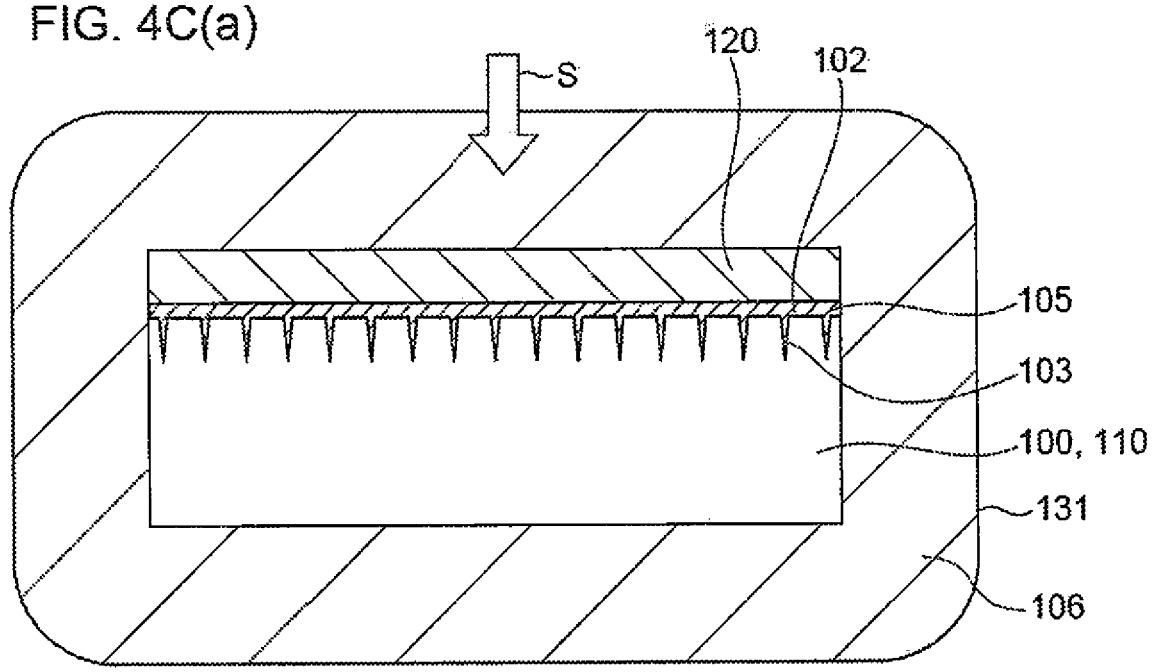
FIG. 4C(a) and FIG. 4C(b) are schematic diagrams of a cross section of a target member to be repaired by the method for repairing a ceramic matrix composite according to another embodiment shown in FIG. 2.
Figure 4C:
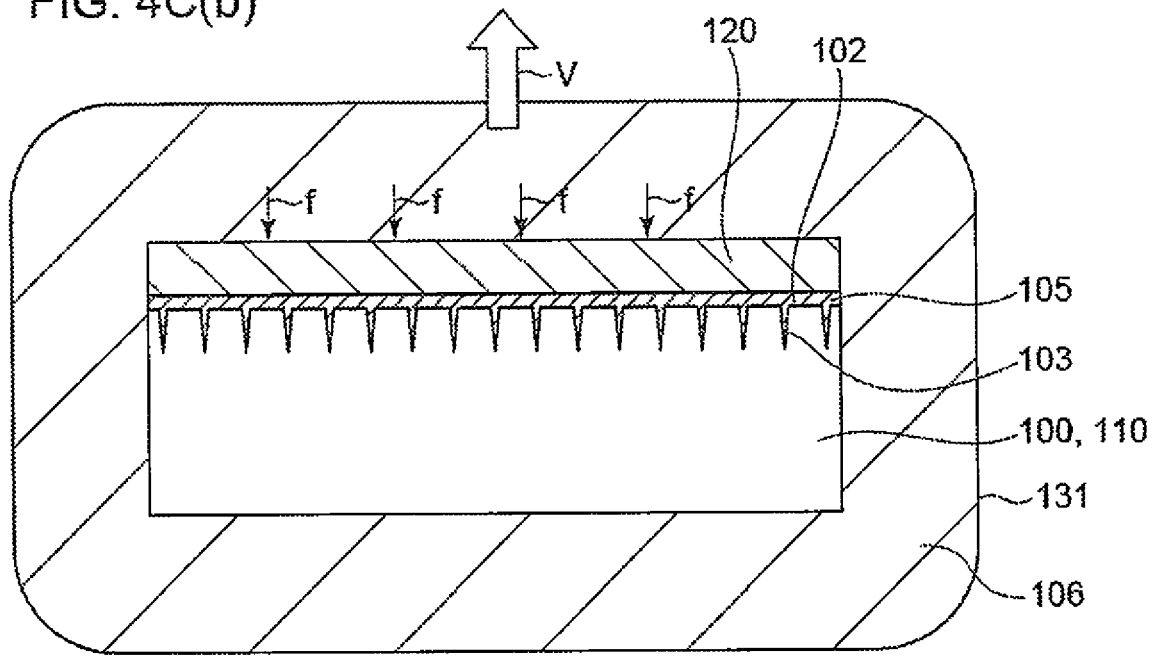

Specifically, in the impregnation step S5, as shown in FIG. 3C(a) and FIG. 4C(a), the target member 100 is covered with a bag 131 or a sheet-shape member so as to seal at least the joint surface 102 and the green body 120 air-tightly, and the impregnation slurry 106 having the same composition as the material slurry is injected into the portion covered with the bag 131 or a sheet, as indicated by the arrow S. Further, the slurry concentration of the impregnation slurry 106 may be different from that of the material slurry. Further, a part of components or the content ratio or the like of a sintering agent may be different between the impregnation slurry 106 and the material slurry.

Then, as shown in FIGS. 3C(b) and 4C(b), as the inside of the portion covered with the bag 131 or the sheet is vacuumed and depressurized, the bag 131 or the sheet contracts, and pushes the green body 120 against the joint surface 102 as indicated by the arrow 'f'. Accordingly, the impregnation slurry 106 permeates into the green body 120 and between the green body 120 and the joint surface 102. Further, as an external pressure acts on the impregnation slurry 106 as described above, the impregnation slurry 106 permeates sufficiently into non-depicted apertures in the matrix having openings into the joint surface 102, and into the hole 103 formed in the hole-forming step S3.

Figure 6:
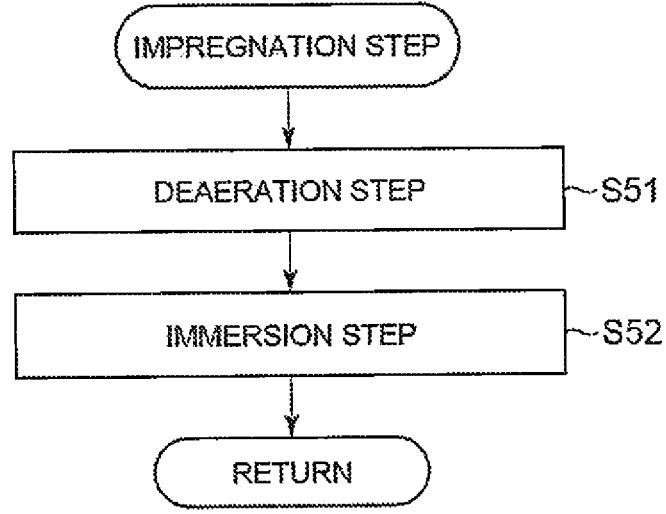
FIG. 6 is a flowchart showing a process for impregnation using impregnation slurry by a process according to the VaRTM method in the impregnation step.

In the impregnation step S5, the target member 100 may be impregnated with the impregnation slurry 106 by a method according to the Vacuum assisted Resin Transfer Molding (VaRTM), which is a type of resin transfer molding (RTM) methods. In this case, as shown in FIG. 6, the impregnation step S5 includes: a deaeration step S51 of covering at least a portion of the target member 100 where the green body 120 for repair is disposed with the bag 131 or a sheet-shaped member as described above, and deaerating at least the portion of the target member 100 where the green body 120 for repair is disposed; and an immersion step S52 of immersing the portion of the target member 100 where the green body for repair is disposed in the impregnation slurry 106, after the deaeration step S51. FIG. 6 is a flowchart showing a procedure for impregnation using impregnation slurry 106 by a process according to the VaRTM method in the impregnation step S5.

Furthermore, the impregnation step S5 may include impregnating the target member 100 with the impregnation slurry 106 by setting the target member 100 with the green body 120 for repair disposed thereon inside a non-depicted pressurizing device, and pressurizing the impregnation slurry 106.

As described above, in the impregnation step S5, the slurry is caused to impregnate by an external force other than the osmotic pressure of the slurry.

Figure 4D:
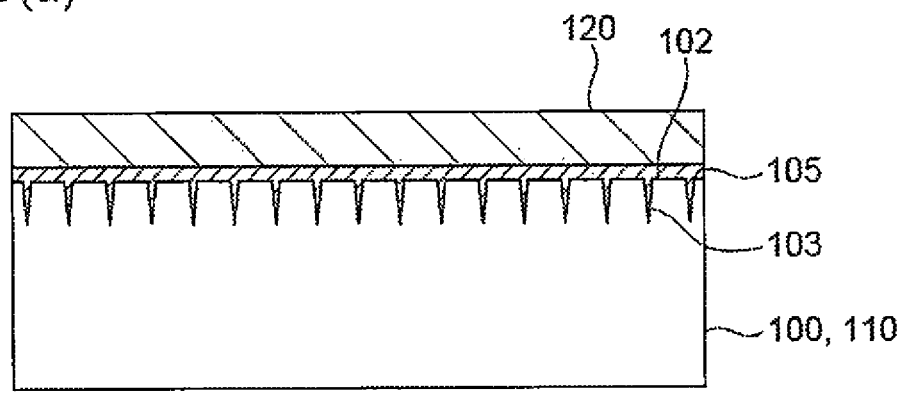
FIG. 4D(a) and FIG. 4D(b) are schematic diagrams of a cross section of a target member to be repaired by the method for repairing a ceramic matrix composite according to another embodiment shown in FIG. 2.
Figure 4D:
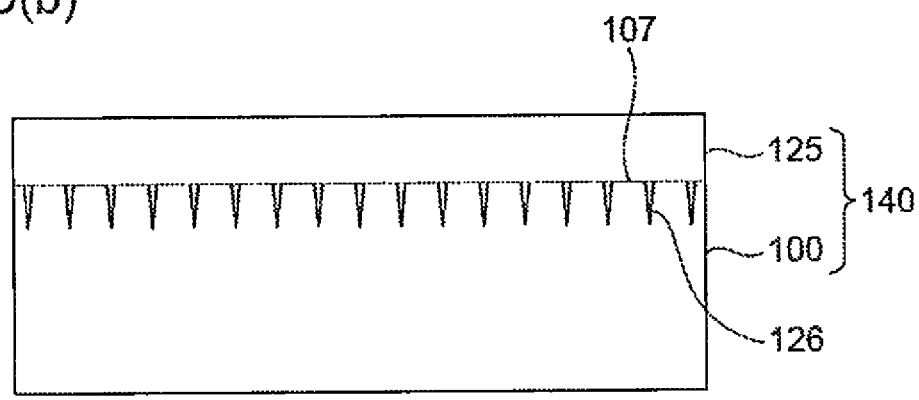

After impregnating the target member 100 with the impregnation slurry 106 in the impregnation step S5, as shown in FIG. 3D(a) and FIG. 4D(a), the bag 131 or the like and excess impregnation slurry 106 are removed, and then in the sintering step S6, the target member 100 on which the green body 120 for repair is sintered. Accordingly, the slurry in the green body 120, the slurry on the joint surface 102, and the slurry permeating into non-depicted apertures in the matrix having openings into the joint surface 102 and the hole 103 are sintered, and become integrated with the matrix of the body portion 110.

Via the sintering step S6, it is possible to obtain a ceramic matrix composite member 140 where the joint portion 125 formed from the green body 120 for repair and the body portion 110 are integrated, which is a repaired CMC component. As described above, the slurry in the green body 120, the slurry on the joint surface 102, and the slurry permeating into the above apertures and the hole 103 are sintered to become integrated with the matrix of the body portion 110, whereby the matrix sintered inside the apertures and the hole 103 functions as an anchor member between the joint portion 125 and the body portion 110. Accordingly, it is possible to improve the adhesion strength between the body portion 110 and the joint portion 125 after sintering.

In particular, in the ceramic matrix composite member 140 according to another embodiment, as shown in FIG. 4D(b), the hole 126 due to the above described hole 103 extends toward the inside of the body portion 110 from the boundary surface 107 between the body portion 110 and the joint portion 125. The hole 126 is filled with the matrix of the ceramic matrix composite member 140, and the filling matrix functions as an anchor member between the joint portion 125 and the body portion 110. Accordingly, it is possible to improve the adhesion strength between the body portion 110 and the joint portion 125 after sintering.

Further, as described below, the hole 103 is formed so as to cut off a part of bundles of ceramic fiber. Thus, in the repaired ceramic matrix composite member 140, the matrix filling the hole 126 formed due to the hole 103 exists so as to cut off a part of bundles of ceramic fiber.

Further, the boundary surface 107 indicated by the double-dotted chain line shown in FIGS. 3D(b) and FIG. 4D(b) is a virtual surface corresponding to the boundary between the body portion 110 and the joint portion 125.

The joint portion 125 is a portion additionally provided for the body portion 110 by the green body 120 for repair. In the following description, the joint portion 125 is also referred to as an additional portion 125.

Accordingly, the joint portion 125 is a portion additionally provided for the portion where the target member 100 is partially removed, and thus the extension direction of bundles of ceramic fiber and the arrangement interval of bundles of ceramic fiber may be different between the body portion 110 and the joint portion 125.

The above described embodiments have the following advantageous effects.

(1) According to some embodiments, a method for repairing a ceramic matrix composite includes: a removal step S1 of removing at least a part of a surface of the target member 100; an arrangement step S4 of arranging a green body 120 for repair which includes the ceramic fiber on a portion where the surface is removed in the removal step S1; an impregnation step S5 of impregnating at least the portion of the target member 100 where the green body 120 for repair is disposed with impregnation slurry 106; and a sintering step S6 of sintering the target member 100 on which the green body 120 for repair is disposed, after the impregnation step S5.

For impregnating at least the portion of the target member 100 where the green body 120 for repair is disposed with the impregnation slurry 106, the impregnation slurry 106 may be injected after air-tightly sealing the circumference of the portion with the green body 120 for repair and depressurizing the portion with the green body 120 for repair, and for instance, the impregnation slurry 106 may be injected under pressure into the air-tightly sealed portion where the green body 120 for repair is disposed. By impregnating at least a portion of the target member 100 where the green body 120 for repair is disposed with the impregnation slurry 106, the slurry sufficiently permeates into the green body 120 for repair and between the green body 120 for repair and the surface of the target member 100. Accordingly, it is possible to improve the adhesion strength between the target member 100 and the additional portion 125 (joint portion 125) additionally provided by the green body 120 for repair, after sintering. Thus, it is possible to ensure the strength of the ceramic matrix composite member 140, which is a repaired CMC component, whereby it is possible to repair and reuse the target member 100, and reduce the costs compared to a case where the target member 100 is replaced with a fresh component.

(2) In some embodiments, the method further includes a hole-forming step S3 of forming at least one hole 103 on the portion where the surface is removed in the removal step S1, after the removal step S1.

The at least one hole 103 is formed on the portion where the surface is removed in the removal step S1, and thus the slurry permeates into the formed hole 103. Thus, when the slurry permeating into the hole 103 is sintered, the slurry functions as an anchor member between the target member and the additional portion 125 additionally provided by the green body 120 for repair. Accordingly, it is possible to improve the adhesion strength between the body portion 110 and the joint portion 125 after sintering.

(3) In some embodiments, the impregnation step S5 includes: a deaeration step S51 of deaerating at least the portion of the target member 100 where the green body 120 for repair is disposed; and an immersion step S52 of immersing the portion of the target member 100 where the green body 120 for repair is disposed in the impregnation slurry 106, after the deaeration step S51.

Accordingly, the slurry permeates into the green body 120 for repair sufficiently, and the slurry permeates sufficiently also between the green body 120 for repair and the target member 100, which makes it possible to improve the adhesion strength between the body portion 110 and the joint portion 125 after sintering.

(4) According to some embodiments, the ceramic matrix composite member 140 is formed from a ceramic matrix composite reinforced by the ceramic fiber, and includes a body portion 110, and a joint portion 125 which is integrally joined to the body portion 110 and which occupies a part of the surface of the ceramic matrix composite member 140. At least one of the extension direction of bundles of ceramic fiber or the arrangement interval of bundles of ceramic fiber is different between the body portion 110 and the joint portion 125.

According to some embodiments, the ceramic matrix composite member 140 includes a body portion 110, and a joint portion 125 which is integrally joined to the body portion 110 and which occupies a part of the surface of the ceramic matrix composite member 140. Such a ceramic matrix composite member 140 can be produced by a method according to the above described embodiments. Further, it is possible to remove the joint portion 125 from the ceramic matrix composite member 140 and join a fresh joint portion 125 integrally to the body portion 110, and thus it is possible to repair the ceramic matrix composite member 140 even if the joint portion of the ceramic matrix composite member 140 becomes damaged.

(5) According to another embodiment, the ceramic matrix composite member 140 is formed from a ceramic matrix composite reinforced by the ceramic fiber, and includes a body portion 110, and a joint portion 125 which is integrally joined to the body portion 110 and which occupies a part of the surface of the ceramic matrix composite member 140. The body portion 110 includes at least one hole extending toward the inside of the body portion 110 from the boundary surface between the body portion 110 and the joint portion 125, the at least one hole being filled with the matrix of the ceramic matrix composite.

According to the other embodiment, the ceramic matrix composite member 140 includes a body portion 110, and a joint portion 125 which is integrally joined to the body portion 110 and which occupies a part of the surface of the ceramic matrix composite member 140. Such a ceramic matrix composite member 140 can be produced by a method according to the other embodiment. Further, it is possible to remove the joint portion 125 from the ceramic matrix composite member 140 and join a fresh joint portion 125 integrally to the body portion 110, and thus it is possible to repair the ceramic matrix composite member 140 even if the joint portion 125 of the ceramic matrix composite member 140 becomes damaged.

Furthermore, with the ceramic matrix composite member 140 according to another embodiment, the body portion 110 includes at least one hole 126 extending toward the inside of the body portion 110 from the boundary surface 107 between the body portion 110 and the joint portion 125, the at least one hole 126 being filled with the matrix of the ceramic matrix composite. Accordingly, the matrix of the ceramic matrix composite filling the hole 126 functions as an anchor member between the body portion 110 and the joint portion 125. Accordingly, it is possible to improve the adhesion strength between the body portion 110 and the joint portion 125 in the ceramic matrix composite member 140, and ensure the strength of the ceramic matrix composite member 140.

(Hole-Forming Position Determination Step S2)

The hole-forming position determination step S2 will be described in detail with reference to FIGS. 7 and 8.

Figure 7:
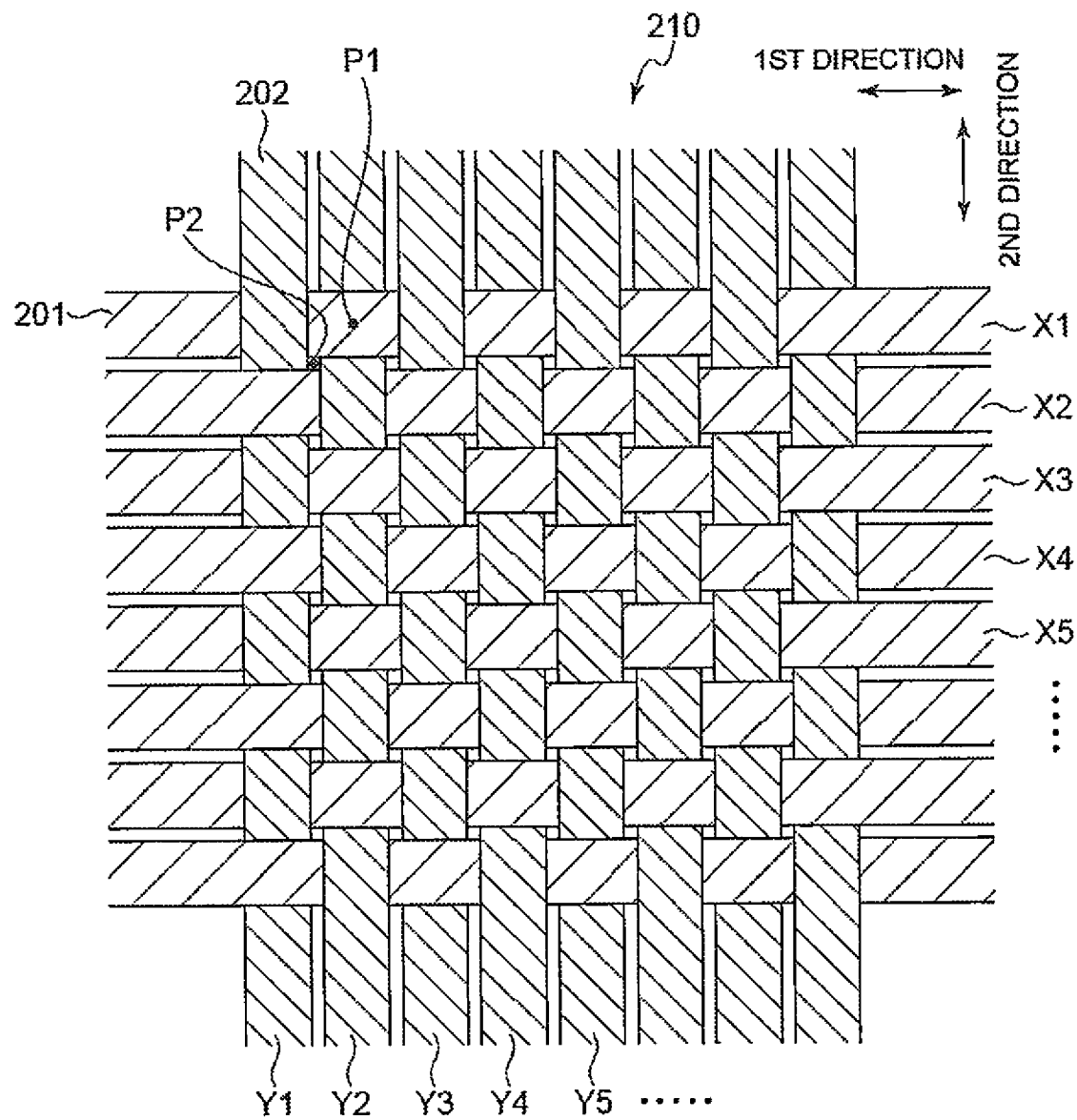
FIG. 7 is a schematic planar view of a layer of fabric woven from ceramic fiber, which is a part of a target member according to some embodiments.
Figure 8A:
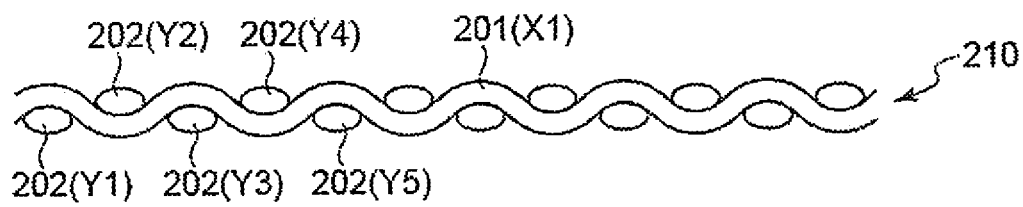
FIGS. 8A to 8C are schematic diagrams of a cross section of fabric woven from ceramic fiber, which is a part of a target member, as seen along the second direction in FIG. 7.
Figure 8B:
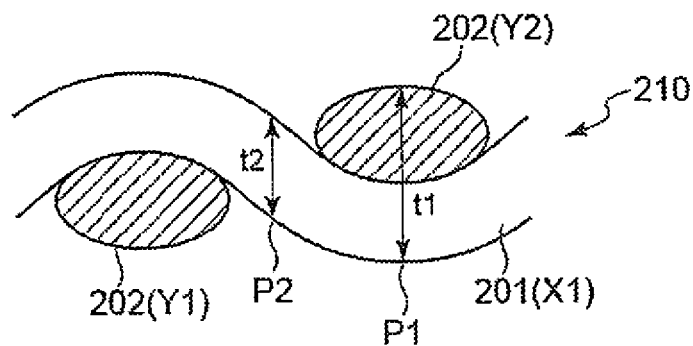
Figure 8C:
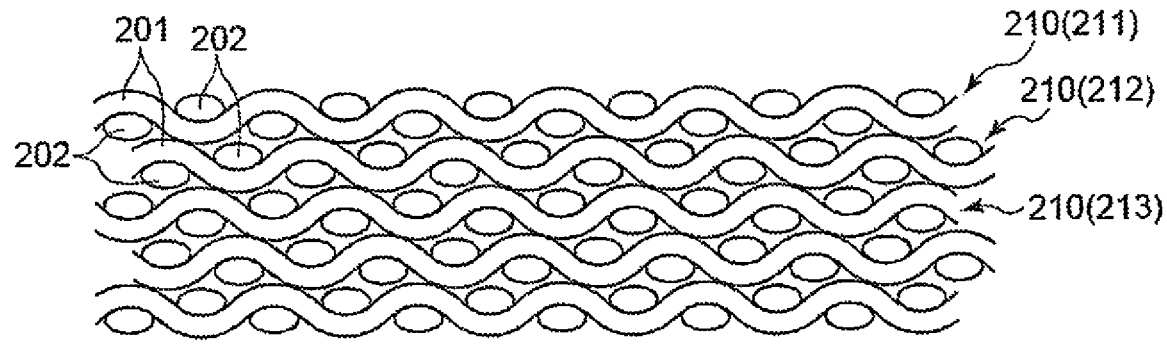

FIG. 7 is a schematic planar view of a layer of fabric woven from ceramic fiber, which is a part of a target member 100, according to some embodiments. FIGS. 8A to 8C are schematic diagrams of a cross section of fabric woven from ceramic fiber, which is a part of a target member 100, as seen along the second direction in FIG. 7. FIG. 8A is a cross section of a single piece of fabric woven from ceramic fiber. FIG. 8B is an enlarged view of a part of FIG. 8A. FIG. 8C is a diagram showing a plurality of laminated layers of fabric.

Before describing the hole-forming position determination step S2, the ceramic fiber in the target member 100 will be described.

As shown in FIGS. 7 and 8, the ceramic fiber contained in the target member 100 as a reinforcing material is woven into fabric, and exists in the target member 100 in the form of a plurality of laminated layers of fabric, where a single layer is a single piece of fabric.

According to some embodiments, each of the layers of fabric woven from ceramic fiber (ceramic fiber layers) 210 is fabric woven from bundles 201, 202 each including a plurality of threads of ceramic fiber, i.e. several hundred to several thousand threads of ceramic fiber. Each layer 210 includes a plurality of bundles 201 extending in the first direction along the right-left direction in FIG. 7 and a plurality of bundles 202 extending in the second direction along the vertical direction in FIG. 7. In the example shown in FIGS. 7 and 8, each layer 210 is woven by plain-weaving. Nevertheless, each layer may be woven by another technique such as twilling.

In FIG. 7, for the sake of convenience, the bundles 201 extending in the first direction are associated with numbers X1, X2, X3, X4, X5, . . . , from the upper side in the drawing, and the bundles 202 extending in the second direction are associated with numbers Y1, Y2, Y3, Y4, Y5, . . . , from the left side in the drawing.

The cross-sectional shape of each bundle 201, 202 has a flattened shape close to an oval shape, having a smaller length in the vertical direction than in the right-left direction, as clearly shown in FIG. 8B. Each layer 210 is woven by the bundles 201, 202 having a flattened-shape cross section, and thus the thickness of each layer 210, i.e., the size in the vertical direction in FIG. 8, varies by location. That is, as shown in FIG. 8B, the thickness t1 of the layer 210 in the position P1 where the center axis of the bundle 201 and the center axis of the bundle 202 overlap in a planar view in FIG. 7 is greater than the thickness t2 of the layer 210 in the position P2 between two adjacent bundles 201 and between two adjacent bundles 202 in a planar view in FIG. 7.

Further, as the cross-sectional shape of each bundle 201, 202 has a flattened shape close to an oval shape, the density of ceramic fiber in the layer 210 varies with the position in a planar view of FIG. 7. That is, as the distance from P1 increases in the second direction, for instance, the number of ceramic fiber that exists in the front-back direction of the bundle 201 in the drawing decreases. Furthermore, with distance from P1 in the first direction, for instance, the number of ceramic fiber that exist in the front-back direction of the bundle 202 in the drawing decreases. Accordingly, with distance from P1 in the first direction or the second direction, for instance, the density of ceramic fiber in the layer 210 decreases.

For instance, the number of ceramic fiber that exists in the front-back direction in the drawing of the layer 210 at the position P1 is greater than the number of ceramic fiber that exist in the front-back direction in the drawing of the layer 210 at the position P2. Thus, the density of ceramic fiber in the layer 210 at the position P1 is higher than the density of ceramic fiber in the layer 210 at the position P2.

Further, in FIGS. 7 and 8, for the sake of convenience in terms of illustration, a gap is depicted between adjacent bundles that extend in the same direction. However, the gap may not necessarily exist.

In some embodiments, as shown in FIG. 8C, a plurality of layers 210 as described above are laminated in the target member 100. In FIG. 8C, the first layer 210 is referred to as the first layer 211, the second layer 210 is referred to as the second layer 212, and the third layer 210 is referred to as the third layer 213, from the upper side in this order.

In the target member 100 containing the layers 210 having the above configuration, when the hole 103 is formed in the hole-forming step S3 shown in FIG. 2, a different number of threads of ceramic fiber constituting each bundle 201, 202 are cut apart due to formation of the hole 103, depending on the position of the hole 103.

Figure 9:
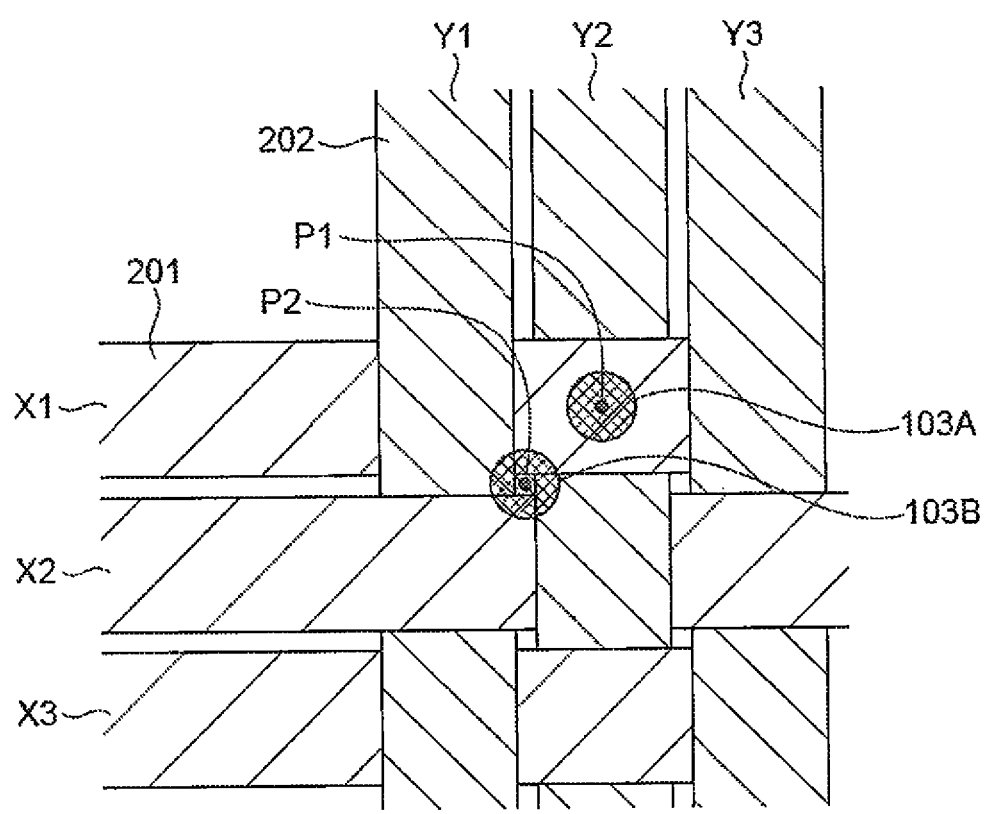
FIG. 9 is an enlarged view of a part of FIG. 7, describing the position for forming a hole.

That is, as shown in FIG. 9 for instance, a hole 103 having a depth corresponding to the thickness of a single layer of the layer 210, which is the thickness t1 in FIG. 8B for instance, is formed. FIG. 9 is an enlarged view of a part of FIG. 7, describing the position for forming hole 103.

As described above, the density of ceramic fiber in the layer 210 at the position P1 is higher than the density of ceramic fiber in the layer 210 at the position P2. Thus, if a hole 103A is formed in the position P1, more threads of ceramic fiber would be cut off compared to a case where a hole 103B is formed in the position P2.

Thus, in some embodiments, to suppress the number of threads of ceramic fiber to be cut off due to formation of the hole 103, the hole 103 is formed in a position where the density of ceramic fiber is low. That is, the target member 100 after removing the circumference of the damaged portion 101 in the removal step S1 includes a first region where the density of ceramic fiber is relatively high, for example, a region in the vicinity of the position P1. Further, the target member 100 after removing the circumference of the damaged portion 101 in the removal step S1 includes a second region where the density of ceramic fiber is lower than the first region, for example, a region in the vicinity of the position P2. Further, in some embodiments, in the hole forming step S3, the hole 103 is formed in the second region.

Specifically, in some embodiments, the hole 103 is formed in a region farther away from the center axis than a region close to the center axis of each of the bundles 201, 202.

The region away from the center axis of each bundle 201 and away from the center axis of each bundle 202 is the above described region close to the above described position P2.

Thus, in some embodiments, the hole 103 is formed in the position P2.

The number of holes 103 to be formed is at least one. With more holes 103, it is possible to enhance the adhesion strength between the joint portion 125 and the body portion 110, but the strength of the ceramic matrix composite member 140 being a repaired CMC component decreases in the extension direction of the layer 210. Thus, in some embodiments, the number of holes 103 to be formed is determined comprehensively taking into account the adhesion strength between the joint portion 125 and the body portion 110, the strength of the ceramic matrix composite member 140 in the extension direction of the layer 210, and the environment in which the ceramic matrix composite member 140 is used.

For instance, in a case where the priority is given to the adhesion strength between the joint portion 125 and the body portion 110, the number of holes 103 to be formed is increased, and in a case where the priority is given to the strength of the ceramic matrix composite member 140 in the extension direction of the layer 210, the number of holes 103 to be formed is reduced.

Furthermore, the formation density of holes 103 may be changed depending on the location of the joint surface 102, in view of the environment in which the ceramic matrix composite member 140 is used, for instance.

In some embodiments, the depth of the hole 103 is smaller than the depth of a single layer of the layer 210. With the hole 103 having a greater depth, it is possible to enhance the adhesion strength between the joint portion 125 and the body portion 110. However, as shown in FIG. 8C, the position of the bundle 202 in the right-left direction in the drawing (i.e. first direction) may be different between the first layer 211 and the second layer 212. Similarly, the position of the bundle 201 in the front-back direction in the drawing (i.e. second direction) may be different between the first layer 211 and the second layer 212. Thus, the above described position P2 may be different between the first layer 211 and the second layer 212 in a planar view of FIG. 7. Thus, in a case where the depth of the hole 103 corresponds to two layers of the layer 210, more than an assumed number of ceramic fiber may be cut off in the second layer 212.

Thus, in some embodiments, the depth of the hole 103 is set to be smaller than the depth of a single layer of the layer 210.

To form the hole 3 in the above described position P2, in some embodiments, the hole-forming position determination step S2 includes capturing an image of the layer 210 of the ceramic fiber remaining on the target member 100, performing an image processing on the image obtained by the capturing, and determining a position for forming the hole 103 on the basis of a result of the image processing.

That is, in the hole-forming position determination step S2, an image of the joint surface 102 is obtained by using an image capturing device to capture an image of the joint surface 102, which appears by removing the circumference of the damaged portion 101 from the target member 100 in the removal step S1. Further, the obtained image of the joint surface 102 is treated with a known image processing, and information is obtained regarding the arrangement position or the extension direction of each of the bundles 201, 202 of the first layer 211 that appears on the joint surface 102. Further, on the basis of the obtained information, a plurality of positions corresponding to the above described position P2 are specified.

Depending on the state of the joint surface 102, it may be difficult to determine the state of each of the bundles 201, 202 of the first layer 211. In such a case, the joint surface 102 may be polished further, for instance, to expose the side portion of each of the bundles 201, 202. If the side portion of each of the bundles 201, 202 is partially exposed, it is possible to estimate the arrangement position of each of the bundles 201, 202 by referring to the information at the time of design of the target member 100, that is, the type of the weaving technique used for the layer 210, the thickness of the ceramic fiber, the number of ceramic fiber in each of the bundles 201, 202, the arrangement pitch of each of the bundles 201, 202, for instance.

Further, of the plurality of positions corresponding to the position P2 specified as described above, the position for forming the hole 103 is determined. Specifically, the position for forming the hole 103 is determined in accordance with the number of holes 103 to be formed which is determined comprehensively taking into account the adhesion strength between the joint portion 125 and the body portion 110, the strength of the ceramic matrix composite member 140 in the extension direction of the layer 210, and the environment in which the ceramic matrix composite member 140 is used.

The information of the position of the hole 103 determined as described above is output to the control device of a hole-forming device (not depicted).

Furthermore, the above described embodiments have the following advantageous effects.

(6) In some embodiments, the portion removed in the removal step S1 includes a first region where the density of ceramic fiber is relatively high, and a second region where the density of ceramic fiber is lower than the first region. Further, in the hole forming step S3, at least one hole 103 is formed in the second region.

Accordingly, it is possible to suppress the number of threads of ceramic fiber to be cut off due to formation of the hole 103. Thus, it is possible to suppress a decrease in the strength of the repaired ceramic matrix composite member 140, while improving the adhesion strength between the body portion 110 and the joint portion 125 after sintering.

(7) In some embodiments, the layer 210 of ceramic fiber includes, as bundles 201 extending in the first direction, a bundle associated with the number X1 in FIG. 7 (hereinafter, referred to as the first bundle X1) and a bundle associated with the number X2 extending in the first direction adjacent to the first bundle X1 (hereinafter, referred to as the second bundle X2). Similarly, the layer 210 of ceramic fiber includes, as bundles 202 extending in the second direction, a bundle associated with the number Y1 (hereinafter, referred to as the third bundle Y1) and a bundle associated with the number Y2 (hereinafter, referred to as the fourth bundle Y2).

The first bundle X1 and the second bundle X2 intersect with the third bundle Y1 and the fourth bundle Y2, respectively, in a planar view in FIG. 7.

In the hole forming step S3, the hole 103 is formed in the position P2 between the first bundle X1 and the second bundle X2 and between the third bundle Y1 and the fourth bundle Y2.

Accordingly, it is possible to suppress the number of threads of ceramic fiber to be cut off due to formation of the hole 103 in each of the bundles 201, 202. Thus, it is possible to suppress a decrease in the strength of the repaired ceramic matrix composite member 140, while improving the adhesion strength between the body portion 110 and the joint portion 125 after sintering.

(8) In some embodiments, the method further includes, after the removal step S1, a hole-forming position determination step S2 of capturing an image of a layer 210 of the ceramic fiber remaining on the target member 100, performing an image processing on the image obtained by the capturing, and determining a position for forming the at least one hole 103 on the basis of a result of the image processing.

Accordingly, it is possible to determine the position for forming the hole 103 so as to cut off as few ceramic fiber as possible. Thus, it is possible to suppress a decrease in the strength of the ceramic matrix composite member 140, while improving the adhesion strength between the body portion 110 and the joint portion 125 after sintering.

(9) In some embodiments, the depth of the at least one hole 103 is smaller than the thickness of a single layer of the layers 210 of ceramic fiber.

Accordingly, ceramic fiber is cut off due to formation of the hole 103 only within a single layer of the layers 210 of fabric of ceramic fiber. Thus, it is possible to suppress a decrease in the strength of the ceramic matrix composite member 140, while improving the adhesion strength between the body portion 110 and the joint portion 125 after sintering.

Embodiments of the present invention were described in detail above, but the present invention is not limited thereto, and various amendments and modifications may be implemented.

For instance, in the above another embodiment, the hole-forming position determination step S2 includes performing a known image processing on a captured image of the joint surface 102, and thereby information is obtained regarding the arrangement position or the extension direction of each of the bundles 201, 202 of the first layer 211 that appears on the joint surface 102. However, the position for forming the hole 103 may be determined visually.

Further, although not mentioned specifically in the above description, the ceramic matrix composite member 140 obtained by the sintering step S6 may go through a machine processing if needed.

DESCRIPTION OF REFERENCE NUMERALS

100 Target member
102 Joint surface
103 Hole
105 Slurry (application slurry)
106 Slurry (impregnation slurry)
110 Body portion
120 Green body
125 Joint portion
140 Ceramic matrix composite member
210 Layer (layer of fabric woven from ceramic fiber, ceramic fiber layer)

The invention claimed is:

1. A method for repairing a target member including a ceramic matrix composite reinforced by ceramic fiber, the method comprising:
   a removal step of removing at least a part of a surface of the target member;
   a hole-forming step of forming at least one hole on the portion where the surface is removed after the removal step;
   an arrangement step of arranging a green body for repair which includes the ceramic fiber on a portion where the surface is removed in the removal step;
   an impregnation step of impregnating at least the portion of the target member where the green body for repair is disposed with slurry; and
   a sintering step of sintering the target member on which the green body for repair is disposed, after the impregnation step wherein the portion where the surface is removed in the removal step includes a first region where a density of the ceramic fiber is relatively high and a second region where the density of the ceramic fiber is lower than that in the first region, and wherein the hole-forming step includes forming the at least one hole by drilling the at least one hole in the second region.

2. The method for repairing a ceramic matrix composite according to claim 1,
   wherein the ceramic fiber includes a layer including a first bundle of the ceramic fiber extending in a first direction, a second bundle of the ceramic fiber extending in the first direction adjacent to the first bundle, a third bundle of the ceramic fiber extending in a second direction interesting with the first direction, and a fourth bundle of the ceramic fiber extending in the second direction adjacent to the third bundle, the first bundle and the second bundle intersecting with the third bundle and the fourth bundle, respectively, and
   wherein the hole-forming step includes forming the at least one hole in a position between the first bundle and the second bundle, and the hole formed is also in a position between the third bundle and the fourth bundle.

3. The method for repairing a ceramic matrix composite according to claim 1, further comprising, after the removal step, a hole-forming position determination step of capturing an image of a layer of the ceramic fiber remaining on the target member, performing an image processing on the image obtained by the capturing, and determining a position for forming the at least one hole on the basis of a result of the image processing.

4. The method for repairing a ceramic matrix composite according to claim 2,
wherein a depth of the at least one hole is smaller than a thickness of a single layer of the ceramic fiber.

5. The method for repairing a ceramic matrix composite according to claim 1,
wherein the impregnation step includes:
a deaeration step of deaerating at least a portion of the target member where the green body for repair is disposed; and
an immersion step of immersing at least the portion of the target member where the green body for repair is disposed in the slurry, after the deaeration step.

6. The method for repairing a ceramic matrix composite according to claim 1,
wherein the impregnation step comprises;
a step of covering the target member on which the green body for repair is disposed with a bag or a sheet, and injecting the slurry into an inside of the bag or the sheet covering a portion of the target member; and
a step of vacuuming and depressurizing the inside of the bag or the sheet covering the portion of the target member, after the step of injecting the slurry.

7. The method for repairing a ceramic matrix composite according to claim 1, wherein the impregnation step includes a step of arranging, inside a pressurizing device, the target member on which the green body for repair is disposed, and pressurizing the slurry.

* * * * *